INVENTORS
HERBERT H. BUSCHERS,
PEDRO C. MEDINA,
ROGER W. WILSON,
BY Martin E. Hogan Jr.
ATTORNEY

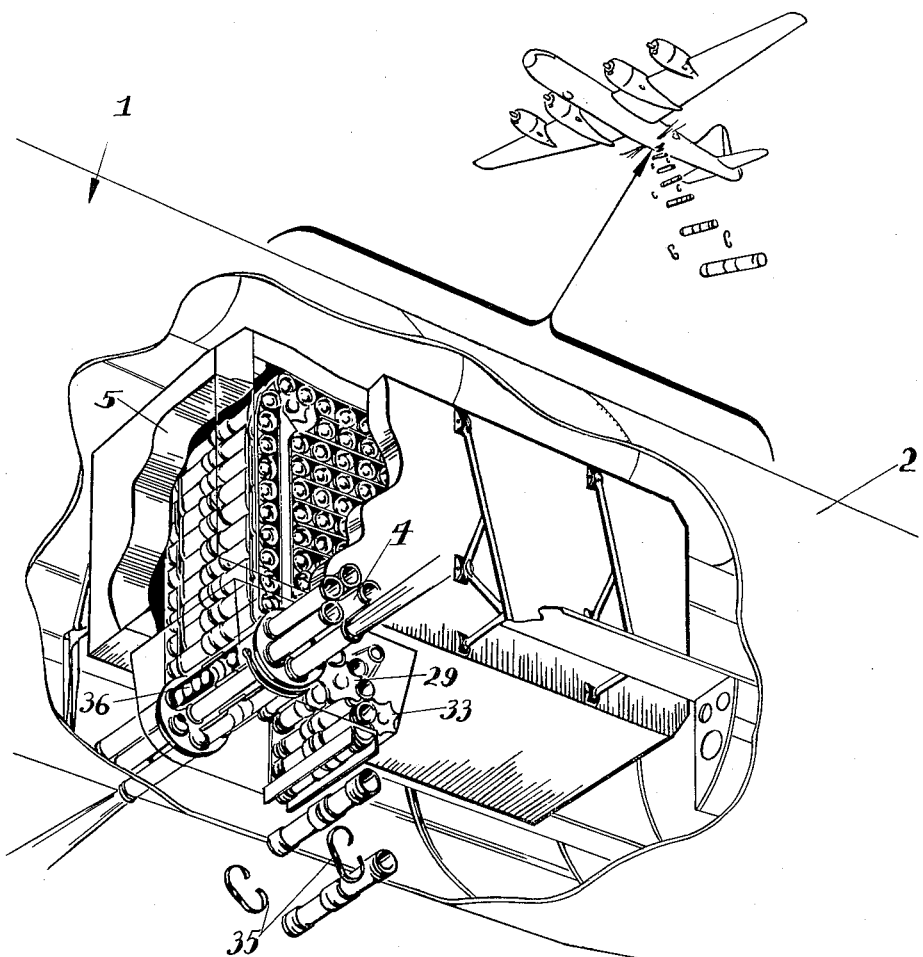
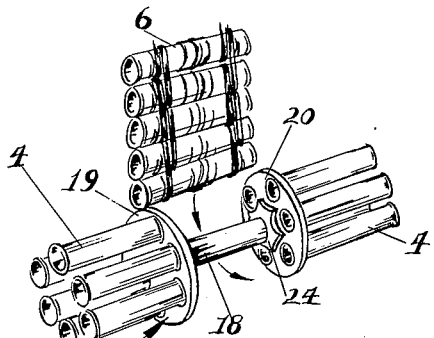

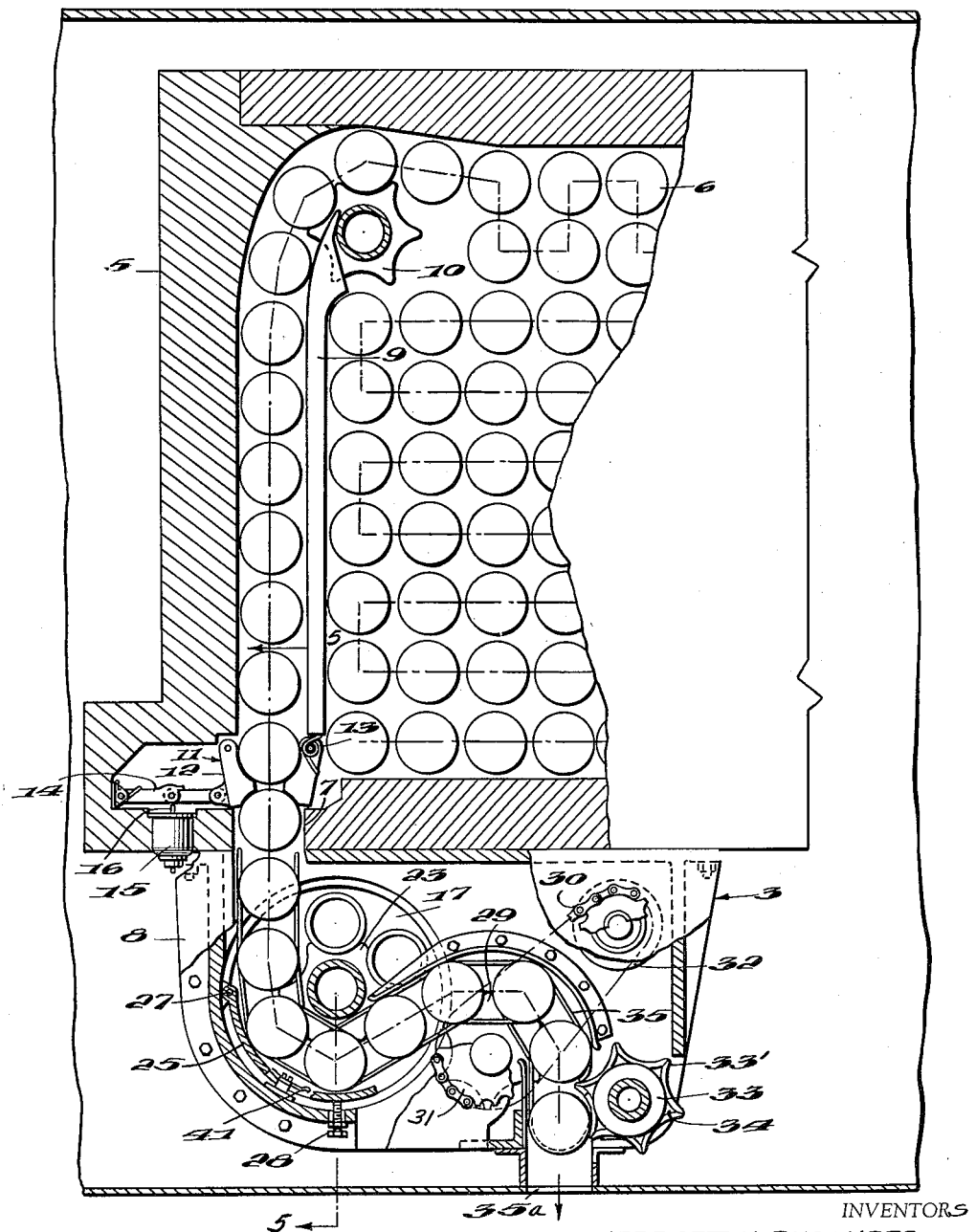

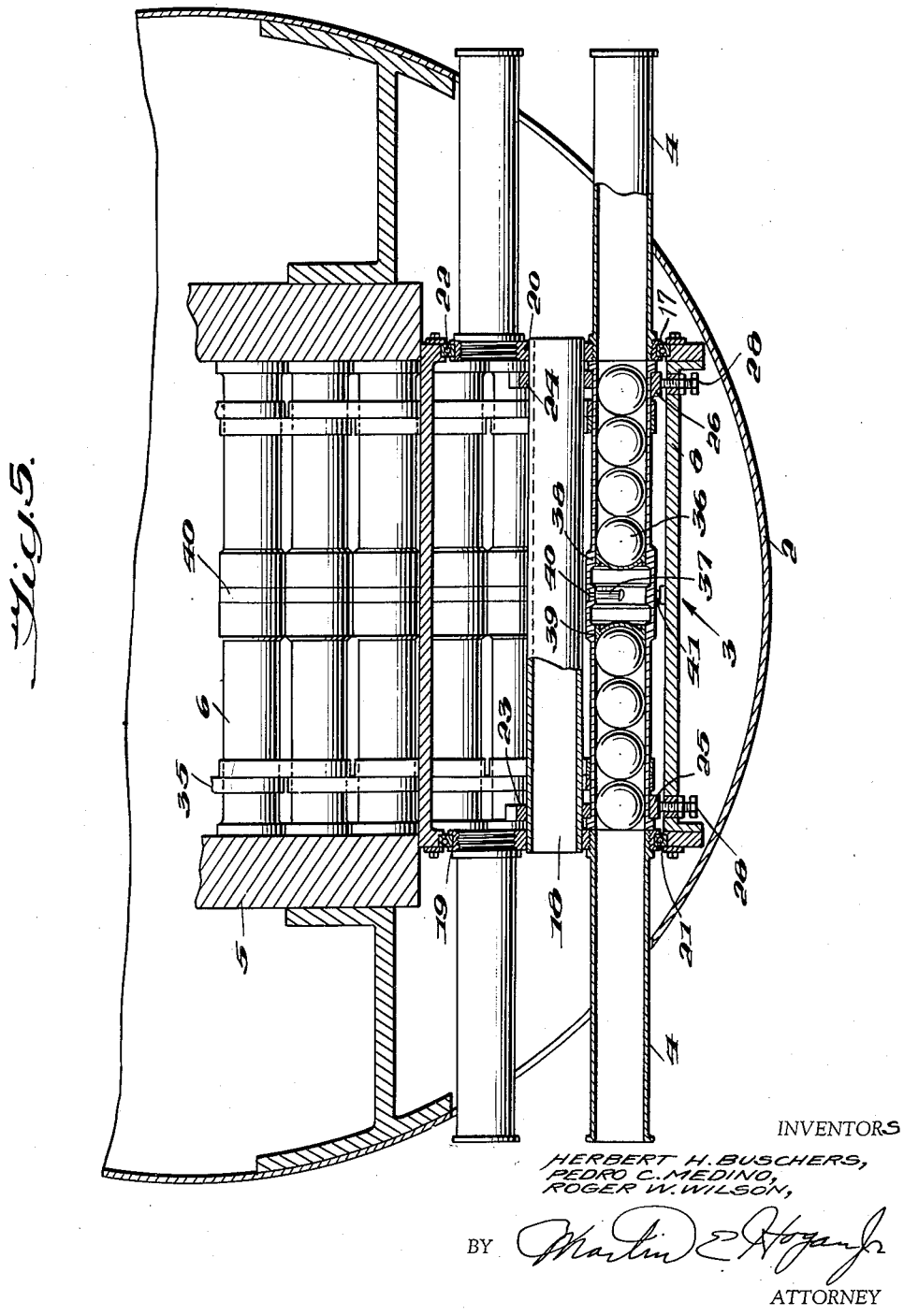

United States Patent Office 2,979,991
Patented Apr. 18, 1961

2,979,991

RAPID FIRING RECOILLESS BOMB PROJECTING DEVICE

Herbert H. Buschers, Towson, and Pedro C. Medina and Roger W. Wilson, Baltimore, Md., assignors to The Martin Company, Middle River, Md., a corporation of Maryland Filed Oct. 10, 1951, Ser. No. 250,758

2 Claims. (Cl. 89—1.5)

This invention relates generally to an aircraft bombing technique and more particularly to an automatic recoilless gun having a high cyclic firing rate adapted for such use.

To effectively saturate a given area with small bombs dropped from aircraft, it is obvious that the time interval between firings must be extremely short, lest the midget bombs will be spaced so far apart that only spot damage will result. Also, the bombs must be uniformly distributed over the target area rather than be concentrated in only certain portions of that area. These objectives cannot be realized using conventional bombing techniques, but require an entirely new system, one which will positively control the release of the bombs in a uniform timing sequence and at a rate sufficient to saturate a target area even when operating from high speed aircraft.

An object of this invention is to provide an automatic gun assembly adapted for mounting within an aircraft so as to fire in a direction generally normal to the flight path and at a high cyclic rate for saturating a relatively large area on either side of the aircraft with destructive material.

Another object of this invention is to provide an automatic recoilless gun which is substantially free from vibrations during operation whereby an efficient structure particularly adapted for use in aircraft is obtained.

Still another object of this invention is to provide an automatic recoilless gun which is dependable and which requires a minimum of energy for maintaining automatic operation.

Further and other objects will become apparent from the accompanying description and drawings which form a part of this disclosure and in which like numerals refer to like parts.

In the drawings:

Figure 1 is a sectional perspective view of a portion of an aircraft equipped with a bomb projecting device according to this invention;

Figure 2 is a perspective view of the barrel assembly or drum of the bomb projecting device;

Figure 4 is a side elevational view partly in section of the bomb projecting device mounted within the aircraft, and showing its relationship to the ammunition box;

Figure 5 is a section taken approximately along line 5—5 in Figure 4, showing the manner in which the belted ammunition feeds through the barrel assembly or drum of this device.

Figure 3:
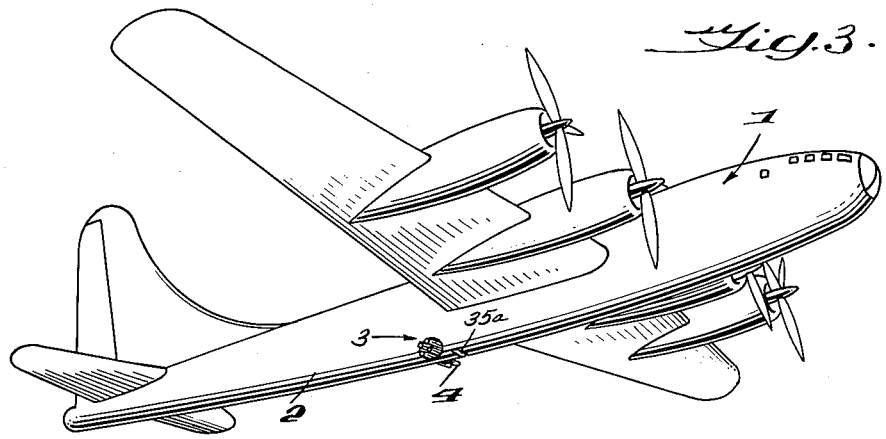
Fig. 3 is a perspective view showing the exterior of an aircraft in which the present bomb projecting device is mounted.
Figure 3A:
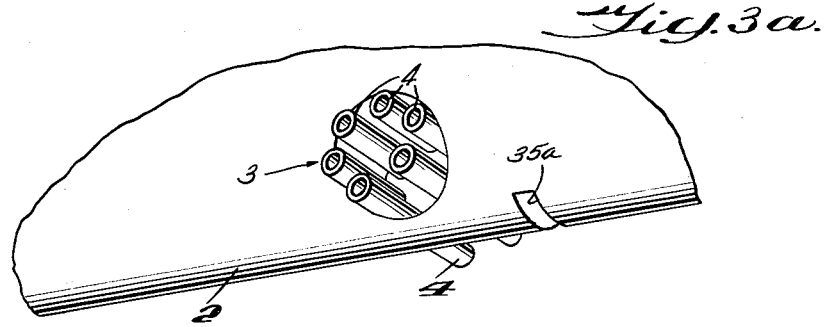
Figure 3a is an enlarged view of a portion of the aircraft fuselage shown in Figure 3 in the area of the gun assembly.

A bomb projecting device according to this invention is adapted to be placed in an aircraft 1 in the manner shown in Figures 1 and 3 of the drawing. This device is placed inside the fuselage 2 of the aircraft, and consists of a gun assembly 3 having barrels 4 that are aimed generally normal to the longitudinal axis of the aircraft so that projectiles may be fired in the athwartship direction.

Gun assembly 3 as shown in Figures 4 and 5 includes a housing forming an ammunition box 5 adapted to store belted ammunition 6. An opening 7 is formed in the bottom wall of box 5 so as to provide an outlet for removal of the ammunition. As shown in Figure 4, a partition member 9 is provided which forms a pathway within the box through which ammunition belt 6 may be fed without interference to opening 7. To facilitate removal of belt 6 over the upper portion of partition 9, an idling sprocket 10 is provided which is adapted to rotate as the belt passes therealong.

To conrtol movement of the belt through opening 7 in ammunition box 5 a latch mechanism 11 is provided which includes a pair of pawls 12 and 13 which are spring urged in the locked position as shown in Figure 4. Pawl 13 is moved to the unlocked position by merely pulling the ammunition from the box. The movement of pawl 12 is positively controlled by a toggle linkage 14 so that the locking mechanism cannot be unlocked without first actuating the toggle. Actuation of linkage 14 for unlocking mechanism 11 is accomplished by a release solenoid 15 having an axially movable pin 16 which contacts toggle linkage 14 so as to cause pawl 12 to pivot out of the path of the ammunition.

Gun cradle 8 carried by ammunuition box 5 adjacent opening 7 rotatably supports a drum 17 which is adapted to receive the belted ammunition 6 for firing of each round through a pair of the plurality of barrels or firing tubes 4 mounted thereon as shown in Figures 4 and 5. As best shown in Figures 2 and 5, drum 17 includes a shaft 18 rigidly carrying circular discs 19 and 20 at either end thereof. Discs 19 and 20 engage, at their outer periphery, bearings 21 and 22 which are in turn carried by gun cradle 8. The firing tubes or barrels 4 are carried by discs 19 and 20 in diametrically opposed relationship to one another and generally normal to the plane of rotation of drum 17 so that each round of ammunition fires through a pair of the tubes in opposite directions. The belted ammunition 6 is positioned in co-axial alignment with a pair of the firing tubes 4 by means of sprockets 23 and 24 rigidly secured to shaft 18 and a pair of shoes 25 and 26. As shown in Figure 4, shoes 25 and 26 are pivotally supported at one end 27 to cradle 8 and seated against an adjustable set screw 28 adjacent their opposite end so as to provide an adjustment for insuring proper loading of ammunition 6 on drum 17. A driving sprocket 29 is rotatably supported by gun cradle 8 and displaced to one side of drum 17 as shown in Figure 4. The sprocket 29 is positioned substantially on the opposite side of the drum from the belt entry location so as to pull the belt of ammunition 6 through drum 17 in such a way that each round of the ammunition remains in co-axial alignment with its pair of firing tubes for a substantial period of time during rotation and while being fired. Drive sprocket 29 is driven by motor 32 through a chain 30 and sprocket wheel 31 arrangement. The empty rounds of ammunition passing over drive sprocket 29 engage a stripper 33 also rotatably carried by cradle 8. Stripper 33 is formed with a plurality of cutters 34 which engage bands 35 linking the rounds of ammunition together to form the belt. As each round of ammunition is pushed along its path by stripper 33 a cog 33' is engaged, causing one of the cutters to move into contact with a band 35. Further rotation of stripper 33 causes the band to fail so as to allow the empty round to fall free of the live rounds remaining on belt 6. The spent ammunition after passing through the stripper area is allowed to fall through an opening 35a formed in the structure shown in Figure 4.

Each round of ammunition 6 in the belt as shown in Figure 5 contains eight individual spherical bombs 36, four on either side of a propellant charge 37 within a tubular casing 38. The propellant charge 37 is separated from the individual bombs 36 by obturators 39 adapted to provide a better distribution of forces tending to shoot the bombs through the opposed firing tubes 4 upon detonation of charge 37. With this firing arrangement wherein the bombs are fired in opposed directions, no recoil loads are present to set up vibrations or other disturbing forces within the aircraft. A thin band 40 extends circumferentially around housing 38 of each round of ammunition and is in electrical communication with charge 37 so that by feeding an electrical impulse through ring 40, charge 37 is detonated. As shown in Figures 4 and 5, an electrical contact 41 is carried by gun cradle 8 so that as the belt of ammunition is fed through drum 17 it will contact band 40 and detonate the charge 37 for firing the round when in co-axial alignment with one pair of the firing tubes 4.

Figure 6:
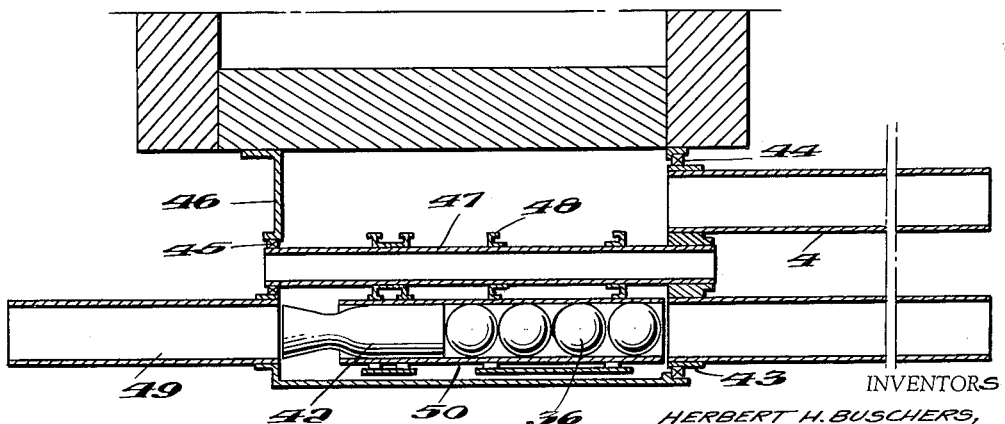
Figure 6 is a sectional view similar to Figure 5 showing a modified form of the invention, adapted to utilize rocket type ammunition.

A modified form of the gun shown in Figures 4 and 5 is shown in Figure 6 wherein rocket type ammunition is employed so as to fire in only one direction while still maintaining the recoilless principle. Each round of ammunition includes a small rocket motor 42 which drives the spherical bombs from casing 50 and out through the co-axially aligned firing tube. The gun arrangement includes a plurality of firing tubes 4 on a rotatable disc 43 supported through bearings 44 and 45 by gun cradle 46. As is seen from Figure 6, bearing 45 engages shaft 47 directly at one end instead of through a disc as in the embodiment shown in Figures 4 and 5. Shaft 47 is provided with suitable seating surfaces 48 for aligning the rounds of ammunition in co-axial relationship with the firing tubes 4. An exhaust tube 49 extends axially with respect to tubes 4 and is fixedly attached to gun cradle 46 so that as the rounds of ammunition are fired through firing tubes 4, the exhaust from rocket motor 42 of each round may pass through exhaust tube 49 and thereby eliminate recoil forces within the structure. Where it is desired to release the bombs from both sides of the aircraft, the rocket type units must of course be used in pairs and arranged in opposite athwartship directions.

Gun assembly 3 requires a very small amount of energy for its operation since there is no stopping and starting before and after firing each round of ammunition. When ammunition box 5 is loaded with the ammunition belt 6 so that one end of the belt is fed through opening 7, around sprocket 23 is drum 17 and drive sprocket 29, the assembly is ready to start automatic operation. Since the first few rounds of ammunition on belt 6 will not be fired in the gun, they are preferably dummy rounds merely used to start the gun operating. When the aircraft has reached the target area, release solenoid 15 is actuated causing movement to toggle linkage 14 so as to allow pawl 12 to pivot outwardly from the path of the ammunition. Motor 32 is caused to rotate drive sprocket 29 so that the ammunition belt is moved along its path through the gun. As each individual round of ammunition passes over electrical contact 41, an impulse is transmitted through band 40 so as to ignite the charge 37 and cause the plurality of small bombs carried therein to be fired in opposite directions through the associated pair of co-axially aligned firing tubes 4. The energy imparted to the spherical bombs contained in successive rounds of ammunition is varied so that the bombs strike the ground at different lateral distances from the aircraft flight path. This is accomplished by controlling the amount of propellant charge carried in each round. By firing these rounds of ammunition at a very high rate, as made possible by the described arrangement, the destructive force can be distributed very effectively over a given area. As each round of ammunition passes over contact 41, a preceding round in the belt moves into position relative to another pair of the firing tubes so that the ammunition may be fired without stopping the movement of drum 17. Since there are six pairs of barrels carried by discs 19 and 20, each pair is used only one-sixth of the time, thereby eliminating trouble caused by overheating. The empty rounds of ammunition passing over drive sprocket 29 contact stripper 33 so that its cutting edge 34 moves into contact with bands 35 joining adjacent rounds together and causes it to break whereby the empty rounds of ammunition are removed from the belt and allowed to fall through opening 35 and free of the gun assembly.

Operation of the modified form of the gun assembly as shown in Figure 6 is similar to that described in connection with Figures 4 and 5. The rotatable drum 43 positions the belt of ammunition so that each round is in co-axial alignment with one of the plurality of firing tubes 4 and with exhaust tube 49 at the time of firing. The time interval required for firing the rocket in each round of ammunition is sufficiently short as to permit constant rotation of drum 43 without also requiring rotational movement of exhaust tube 49.

Constant rotation of the firing mechanism in gun assembly 3 sizably reduces the energy required for operation as compared with an intermittent operating system. This results in a considerable savings in weight and a more dependable operating mechanism. A very high firing rate results from the described arrangement whereby area bombing as hereinbefore described is made successful since destructive material may be sufficiently concentrated even when operating from high speed aircraft. Where an even greater concentration of bombs is desired, two or more of the gun assembly units may of course be employed.

It is to be understood that certain changes, alterations, modifications and substitutions can be made without departing from the spirit and scope of the appended claims.

We claim as our invention:

1. In a rapid firing recoilless bomb projecting device having opposed rotating barrels, an uninterrupted firing sequence and utilizing belted ammunition of the type wherein each round of ammunition consists of a firing chamber and individual bombs disposed on each side of an explosive charge centrally located in each chamber; said device comprising a gun cradle, a rotary barrel assembly rotatably supported by said gun cradle, said barrel assembly comprising two parallel discs interconnected so as to have a common axis, upon each of which discs are mounted a plurality of aligned gun barrels pointed in opposite directions, the gun barrels on each disc being spaced in a circular array and with the barrels of one disc in alignment with the barrels of the other disc, said discs being axially removed so as to define a space therebetween, means to bring rounds of belted ammunition to said barrel assembly, said rounds being received upon said barrel assembly with each round located in said space and in firing relation with a pair of aligned barrels, driving means to feed said belted ammunition uninterruptedly through said device, thereby to rotate the barrel assembly at constant speed, and means to fire said explosive charges while the rounds are located on said barrel assembly whereby the respective bombs are fired simultaneously in opposite directions through a pair of barrels.

2. In a rapid firing recoilless bomb projecting device having opposed rotating barrels, an uninterrupted firing sequence and utilizing belted ammunition of the type wherein each round of ammunition consists of a firing chamber and individual bombs disposed on each side of an explosive charge centrally located in each chamber; said device comprising a gun cradle, a rotary barrel assembly rotatably supported by said gun cradle, said barrel assembly comprising two parallel discs interconnected so as to have a common axis, upon each of which discs are mounted a plurality of aligned gun barrels pointed in opposite directions, the gun barrels on each disc being spaced in a circular array and with the barrels of one disc in alignment with the barrels of the other disc, said discs being axially removed so as to define a space therebetween, means to bring rounds of belted ammunition to said barrel assembly, said rounds being received upon said barrel assembly with each round located in said space and in firing relation with a pair of aligned barrels, driving means to feed said belted ammunition uninterruptedly through said device, said means including a driving sprocket arranged relative to said barrel assembly so as to maintain a substantial angle of wrap of said belted ammunition about said barrel assembly, said barrel assembly thereby being caused to rotate at constant speed, and means to fire said explosive charges while the rounds are located on said barrel assembly whereby the respective bombs are fired simultaneously in opposite directions.

References Cited in the file of this patent

UNITED STATES PATENTS

| | | |
|---|---|---|
| 43,903 | Douglass | Aug. 23, 1864 |
| 332,741 | Palmer | Dec. 22, 1885 |
| 476,590 | Archbold | June 7, 1892 |
| 1,108,717 | Davis | Aug. 25, 1914 |
| 1,311,021 | Spear et al. | July 22, 1919 |
| 1,424,751 | Bangerter | Aug. 8, 1922 |
| 1,434,044 | Cooke | Oct. 31, 1922 |
| 1,446,000 | Davis | Feb. 20, 1923 |
| 1,636,451 | Andrus | July 19, 1927 |
| 2,440,723 | MacDonald | May 4, 1948 |
| 2,485,715 | Eastman | Oct. 25, 1949 |
| 2,546,823 | Holloway | Mar. 27, 1951 |

FOREIGN PATENTS

| | | |
|---|---|---|
| 125,126 | Great Britain | Apr. 17, 1919 |
| 836,792 | France | Jan. 25, 1939 |
| 924,013 | France | July 24, 1947 |
| 632,599 | Great Britain | Nov. 28, 1949 |